United States Patent [19]

Zannucci et al.

[11] 4,418,002

[45] Nov. 29, 1983

[54] MELAMINE GROUP CONTAINING ULTRAVIOLET STABILIZERS AND THEIR USE IN ORGANIC COMPOSITIONS II

[75] Inventors: Joseph S. Zannucci; Wayne P. Pruett, both of Kingsport, Tenn.

[73] Assignee: Eastman Kodak Company, Rochester, N.Y.

[21] Appl. No.: 413,907

[22] Filed: Sep. 1, 1982

[51] Int. Cl.$^3$ .......................... C09K 15/20; C08K 5/16
[52] U.S. Cl. ...................................... 252/403; 524/91; 524/95
[58] Field of Search .................. 252/403; 524/91, 95, 524/100

[56] References Cited

U.S. PATENT DOCUMENTS

| | | | |
|---|---|---|---|
| 3,864,354 | 2/1975 | Irick et al. | 524/91 |
| 4,041,011 | 8/1977 | Pond et al. | 524/91 |
| 4,119,634 | 10/1978 | Schroeder | 524/91 |
| 4,154,891 | 5/1979 | Porter et al. | 524/539 |
| 4,162,254 | 7/1979 | Irick et al. | 524/91 |
| 4,278,590 | 7/1981 | Dexter et al. | 524/95 |

*Primary Examiner*—Irwin Gluck
*Attorney, Agent, or Firm*—Clyde L. Tootle; Daniel B. Reece, III

[57] ABSTRACT

The invention relates to melamine group containing compounds which have been found to be effective ultraviolet stabilizers. The invention also relates to ultraviolet degradable organic compositions containing an amount of a melamine group containing compounds to prevent such degradation. These stabilizers are effective in the presence of other additives commonly employed in polymeric compositions including, for example, pigments, colorants, fillers, reinforcing agents and the like. These ultraviolet stabilizers may be incorporated into the organic compositions such as polymers by adding to the polymer melt or dissolved in the polymer dope, coated on the exterior of the shaped or molded article, film or extruded fiber.

37 Claims, No Drawings

MELAMINE GROUP CONTAINING ULTRAVIOLET STABILIZERS AND THEIR USE IN ORGANIC COMPOSITIONS II

DESCRIPTION

This invention relates to melamine group containing ultraviolet stabilizers and their use in organic compositions. More particularly, the invention relates to melamine group containing compounds and the stabilization of ultraviolet degradable organic compositions against deterioration resulting from the exposure to such radiations with such melamine group containing compounds.

The degradative effects of ultraviolet light on various organic compositions is well known in the art. The photo-deterioration or degradation is of particular concern with organic photo-degradable compositions which are exposed to ultraviolet light, such as sunlight, for long periods of time. One group of such photo-degradable organic compositions is polymeric compositions such as polyolefins, polyesters, polyurethanes and the like. On exposure to sunlight for extended periods of time, these polymeric compositions degrade and their physical properties are reduced to render the polymeric composition less useful for most applications. Therefore, considerable effort has been directed to providing a solution to the photo-degradation problem of polymeric compositions. As a result of this effort, there have been discovered many additives and stabilizers which improve the stability of polymeric compositions.

Moreover, various additives and stabilizers exhibit the power to absorb electromagnetic radiation within the band of 2900 to 4000 A. and, when incorporated in various plastic materials such as transparent sheets, the resultant sheet acts as a filter for all the radiation passing through and will transmit only such radiations as are not absorbed by the sheet and/or the absorbing agent. It is thus possible to screen out undesirable radiations and utilize the resulting transparent sheet as a filter in many technical and commercial applications, such as wrappings for food products and the like.

While there are many additives, stabilizers and mixtures thereof which are known in the art to improve the ultraviolet light stability of organic compositions, there is a need in the art for more efficient and effective stabilizers to prevent the photo-degradation of organic compositions susceptible to photo-degradation. Therefore, to provide a more effective and efficient ultraviolet stabilizer for organic compositions susceptible to such degradation would be an advance in the state of the art.

In accordance with the present invention, organic compositions which are susceptible to ultraviolet degradation, are stabilized against such degradation with a stabilizing amount of a melamine group containing compound. The melamine group containing organic compounds of the present invention have the following structure:

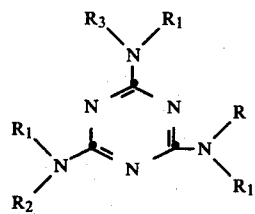

wherein R is a member selected from the group consisting of:

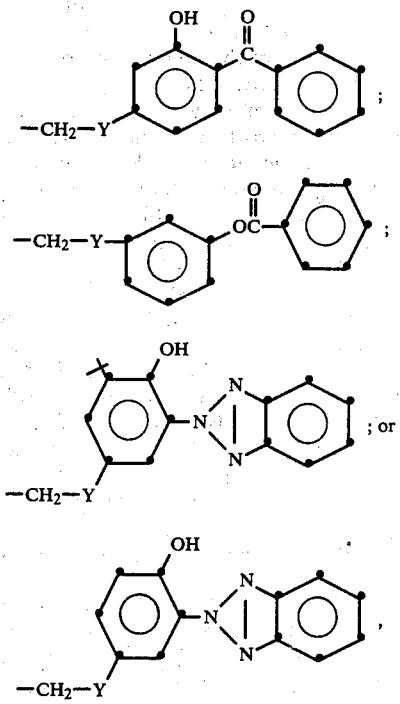

$R_1$ is a member selected from the group consisting of —$CH_2OH$ and —$CH_2OX$ where X is a branched or unbranched alkyl group containing 1 to 18 carbon atoms, $R_2$ is a member selected from the group consisting of:

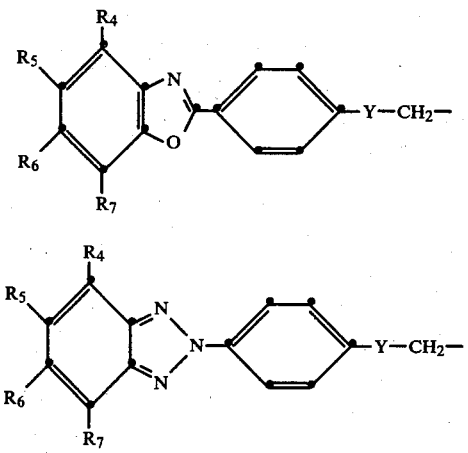

$R_3$ is the same as $R_1$ or $R_2$;

$R_4$, $R_5$, $R_6$ and $R_7$ can be hydrogen, lower branched or unbranched alkyl group containing 1 to 12 carbon atoms, an alkoxy containing 1 to 12 carbon atoms or chloro, and Y is an oxy group, an alkyloxy group, an oxy alkyl oxy group, a carbonyl oxy group, or an oxy alkyl carbonyl group, wherein said alkyl member is a branched or unbranched alkyl group containing 1 to 10 carbon atoms.

The melamine group containing compounds can be prepared by reacting hexaalkoxymethyl melamine or hexahydroxymethylmelamine with two different aromatic alcohols. The degree of substitution of the aromatic alcohol onto the hexasubstituted methylmelamine can be controlled by the amount of aromatic alcohol employed in the reaction. For example, if two different aromatic alcohol members are to be substituted onto the hexamethoxymethylmelamine, then a one mole amount of each aromatic alcohol is employed with a one mole amount of the hexamethoxymethylmelamine. Likewise, if two of the same or two different aromatic alcohol members are to be substituted onto the hexamethoxymethylmelamine, then a molar amount of each such aromatic alcohol is employed.

The reaction can be carried out by dissolving the aromatic alcohol in a suitable solvent, such as toluene. When the alcohol is in solution, the desired amount of hexamethoxymethylmelamine is added together with a catalytic amount of catalyst, such as p-toluene sulfonic acid. Generally, the amount of catalyst necessary for carrying out the reaction is about 0.5 to about 1.5 weight percent based on the amount of reactants. The reaction mixture is allowed to react for a period of about 20 minutes to about 8 hours depending on the temperature of the reaction mixture. At a temperature of about 90° C., the reaction is generally completed in about 30 minutes or less. At temperatures of only about 40° C., longer periods of time are required as, for example, about 6 hours. The catalyst is then neutralized, reaction mixture filtered and solvent and methanol formed during the reaction removed by a vacuum dryer. It should be noted that the solvent can be removed prior to the neutralization, if desired.

The hexamethoxymethylmelamine is a commericially available compound which was first described in 1941 by Gams, Widner and Fisch in *Helv. Chim. ACTA*, 24, 302–19E (1941). Hexamethoxymethylmelamine can be produced by the reaction of melamine with aqueous formaldehyde using an excess of formaldehyde over the theoretical ratio. The hexamethylol compound, if desired, can be converted to the hexamethoxy derivative or other hexaalkoxy derivatives by reaction with excess methyl alcohol, ethyl alohol or higher alcohols in the presence of acid.

One of the aromatic alcohols reacted with the hexamethoxymethylmelamine can be any chromophoric aromatic alcohol. Such aromatic alcohols can be, for example, resorcinol monobenzoate, 2,4-dihydroxy benzophenone, 2-hydroxy-4-hydroxymethoxy benzophenone, 2-hydroxy-4-hydroxyethoxy benzophenone, 2-hydroxy-4-(2-hydroxy-1-oxyethoxy)benzophenone, 4-(2H-benzotriazol-2-yl)phenol, 2[4-(2H-benzotriazol-2-yl)phenoxy]ethanol, 2-(2H-benzotriazol-2-yl)-4-(2-hydroxyethoxy)phenol, 2-(2H-benzotriazol-2-yl)-6-tertiary-butyl-4-(2-hydroxyethoxy)phenol and the like. The other aromatic alcohol can be a phenyl benzoxazolyl alkyl alcohol or a phenyl benzotriazol alkyl alcohol, such as, for example 2-[4-(2H-benzotriazol-2-yl)phenoxy]ethanol, 4-(2H-benzotriazol-2-yl)phenol, 2-hydroxyethyl 4-(2H-benzotriazol-2-yl)benzoate, 4-(2H-benzotriazol-2-yl)benzenemethanol, 4-(2-benzoxazolyl)benzenemethanol, 4-(2-benzoxazolyl)phenol, 2-[4-(2-benzoxazolyl)phenoxy]ethanol, 2-hydroxyethyl 4-(2-benzoxazolyl)benzoate, 4-(5-methoxy-2H-benzotriazol-2-yl)phenol, 4-(5-methoxy-2-benzoxazolyl)phenol, 4-(5-chloro-2H-benzotriazol-2-yl)phenol, 4-(5-methyl-2H-benzotriazol-7-yl)phenol, 4-(5-isobutyl-2H-benzotriazol-2-yl)phenol, 4-(5-chloro-2-benzoxazolyl)phenol, 4-(5-methyl-2-benzoxazolyl)phenol and the like.

The melamine group containing compounds can be added to organic compositions which are susceptible to ultraviolet degradation. Such compositions include, for example, polymeric compositions such as polyester fiber and moldable compositions, such as poly(ethylene terephthalate), poly(tetramethylene terephthalate) and the like; white pigmented polyolefins such as, for example, $TiO_2$ pigmented high, medium and low density polyethylene and propylene; and polyurethanes.

The melamine group containing compounds as effective ultraviolet stabilizers or screening agents are generally used in an amount of from 0.01 to 10%, by weight, based on the weight of the organic material to which they are added. While a detectable amount of ultraviolet screening and stabilization may be obtained with amounts less than 0.01%, this amount of stabilization or screening would be of little practical utility in a commercial application. Moreover, while amounts greater than 10%, by weight, provide effective ultraviolet stability and screening, such concentrations are undesirable because of cost and the deleterious effect which such concentrations may have on the mechanical properties of the organic composition in which the stabilizer is incorporated. Preferably, the stabilizer is used in an amount of from about 0.1 to about 3%, by weight. For example, an amount of 0.5%, by weight of the stabilizer effectively stabilizes polytetramethylene terephthalate plastic compositions.

The ultraviolet stabilized organic compositions containing the stabilizers of the present invention may also contain other additives, pigments, colorants, stabilizers and the like. For example, polymeric compositions, such as polyesters, polyurethanes and polyolefins, may also contain and generally do contain other additives such as white or colored pigments or colorants, antioxidants, plasticizers, flow aids, processing acids, polymeric modifiers and the like.

These melamine group containing ultraviolet stabilizers may be incorporated into organic compositions by melt-blending or may be added onto the surface of an organic plastic material prior to being molded into a suitable object, or added to the surface of the molded object. These materials can also be added to coatings and the like which can be applied to the surface of a molded object.

This invention will be further illustrated by the following examples although it will be understood that these examples are included merely for purposes of illustration and are not intended to limit the scope of the invention.

EXAMPLE 1

About 0.1 mole resorcinol monobenzoate (21.4 g.) is heated at 90° C. in 500 ml toluene until the resorcinol monobenzoate is completely dissolved. About 0.1 mole hexamethoxymethylmelamine (39 g.) and about 0.005 mole p-toluene sulfonic acid (0.95 g.) are added and the reaction is heated for one hour at 90° C. About 0.1 mole 4-(2-benzoxazolyl)benzene methanol is added and reacted for one hour at 90° C. The reaction mixture is neutralized with potassium carbonate, the mixture filtered and the toluene removed from the filtrate under vacuum to obtain primarily the melamine compound containing primarily resorcinol monobenzoate groups and benzoxazolyl benzene methyl groups.

EXAMPLE 2

About 0.01 mole resorcinol monobenzoate (2.14 g.) is added to a 250 ml beaker. About 100 ml of toluene are added to the beaker and the mixture heated with stirring to about 90° C. When the reactant is in solution about 0.01 mole hexamethoxymethylmelamine (3.9 g.) and 0.001 mole p-toluene sulfonic acid (0.19 g.) are added and are reacted for about 30 minutes at about 90° C. About 0.01 mole 2-hydroxyethyl 4-(2-benzoxazolyl)-benzoate is added and reacted for one hour at 90° C. The toluene is removed by vacuum drying and the recovered material is dissolved in about 50 ml ether. About 0.002 mole sodium hydroxide in 20 ml water is added and the liquid is shaken vigorously. The water layer is removed and discarded. The ether layer is washed three times with about 20 ml water in each wash. The ether layer is then dried with magnesium sulfate, filtered and the ether removed under vacuum to provide primarily the melamine compound substituted with resorcinoxymonobenzoate and 2-hydroxyethyl benzoxazolyl benzoate groups.

EXAMPLE 3

About 0.01 mole resorcinol monobenzoate (2.14 g.) and 0.01 mole 2-[4(2H-benzotriazol-2-yl)phenoxy]ethanol is added to a 250 ml beaker. About 100 ml of toluene are added to the beaker and the mixture heated with stirring to about 90° C. When the reactant is in solution about 0.01 mole hexamethoxymethylmelamine (3.9 g.) and 0.001 mole p-toluene sulfonic acid (0.19 g.) are added and are reacted for about 30 minutes at about 90° C. The toluene is removed by vacuum drying and the recovered material is dissolved in about 50 ml ether. About 0.002 mole sodium hydroxide in 20 ml water is added and the liquid is shaken vigorously. The water layer is removed and discarded. The ether layer is washed three times with about 20 ml water in each wash. The ether layer is then dried with magnesium sulfate, filtered and the ether removed under vacuum to provide the substituted melamine compound.

EXAMPLE 4

About 0.01 mole 2-hydroxy-4-(2-hydroxy-1-oxoethoxy)benzophenone (2.72 g.) is added to a 250 ml beaker. About 100 ml of toluene are added to the beaker and the mixture heated with stirring to about 90° C. When the reactant is in solution about 0.01 mole hexamethoxymethylmelamine (3.9 g.) and 0.001 mole p-toluene sulfonic acid (0.19 g.) are added and are reacted for about 30 minutes at about 90° C.; about 0.01 mole 2-hydroxyethyl 4-(2-benzoxazolyl)benzoate is added and reacted for one hour at 90° C. The toluene is removed by vacuum drying and the recovered material is dissolved in about 50 ml ether. About 0.002 mole sodium hydroxide in 20 ml water is added and the liquid is shaken vigorously. The water layer is removed and discarded. The ether layer is washed three times with about 20 ml water in each wash. The ether layer is then dried with magnesium sulfate, filtered and the ether removed under vacuum to provide primarily the melamine compound substituted with 2-hydroxy-4-(2-hydroxy-1-oxoethoxy)benzophenone group and 2-hydroxyethyl 4-(2-benzoxazolyl)benzoate.

EXAMPLE 5

About 0.01 mole 2-hydroxyethyl 4-(2H-benzotriazol-2-yl) benzoate (3.27 g.) is added to a 250 ml beaker. About 100 ml of toluene are added to the beaker and the mixture heated with stirring to about 90° C. When the reactant is in solution about 0.001 mole hexamethoxymethylmelamine (3.9 g.) and 0.01 mole p-toluene sulfonic acid (0.19 g.) are added and are reacted for about 30 minutes at about 90° C.; about 0.01 mole 2-hydroxy-4-(2-hydroxy-1-oxoethoxy)benzophenone is added and reacted for one hour at 90° C. The toluene is removed by vacuum drying and the recovered material is dissolved in about 50 ml ether. About 0.002 mole sodium hydroxide in 20 ml water is added and the liquid is shaken vigorously. The water layer is removed and discarded. The ether layer is washed three times with about 20 ml water in each wash. The ether layer is then dried with magnesium sulfate, filtered and the ether removed under vacuum to provide the substituted melamine compound.

EXAMPLE 6

About 0.01 mole 4-(2H-benzotriazol-2-yl)phenol is added to a 250 ml beaker. About 100 ml of toluene are added to the beaker and the mixture heated with stirring to about 90° C. When the reactant is in solution about 0.001 mole hexamethoxymethylmelamine (3.9 g.) and 0.01 mole p-toluene sulfonic acid (0.19 g.) are added and are reacted for about 30 minutes at about 90° C.; about 0.01 mole 2-hydroxy-4-(2-hydroxy-1-oxoethoxy)benzophenone is added and reacted for one hour at 90° C. The toluene is removed by vacuum drying and the recovered material is dissolved in about 50 ml ether. About 0.002 mole sodium hydroxide in 20 ml water is added and the liquid is shaken vigorously. The water layer is removed and discarded. The ether layer is washed three times with about 20 ml water in each wash. The ether layer is then dried with magnesium sulfate, filtered and the ether removed under vacuum to provide the substituted melamine compound.

EXAMPLE 7

About 0.01 mole 4-(5-methoxy-2H-benzotriazol-2-yl) phenol (3.27 g.) is added to a 250 ml beaker. About 100 ml of toluene are added to the beaker and the mixture heated with stirring to about 90° C. When the reactant is in solution about 0.01 mole hexamethoxymethylmelamine (3.9 g.) and 0.001 mole p-toluene sulfonic acid (0.19 g.) are added and are reacted for about 30 minutes at about 90° C.; about 0.01 mole 2-hydroxy-4-(2-hydroxy-1-oxoethoxy)benzophenone is added and reacted for one hour at 90° C. The toluene is removed by vacuum drying and the recovered material is dissolved in about 50 ml ether. About 0.002 mole sodium hydroxide in 20 ml water is added and the liquid is shaken vigorously. The water layer is removed and discarded. The ether layer is washed three times with about 20 ml water in eash wash. The ether layer is then dried with magnesium sulfate, filtered and the ether removed under vacuum to provide primarily the substituted melamine compound.

EXAMPLE 8

The effectiveness of these stabilizers in acrylic lacquer and an alkide-melamine enamel was demonstrated by dissolving the stabilizer in the coating at a 1% level (based on weight of the coating binder). In preparing this showing, the coatings were sprayed onto primed steel panels, cured and weathered according to ASTM Procedure G 53–77. Degradation of the samples was monitored by 20% gloss measurements or visual appearance (crazing). Gloss was restored to the sample using a cotton gauze-covered wooden block weighted with a 900-gram weight. A few drops of Du Pont No. 7 Cleaner was added to the cotton and the weighted gauze moved back and forth across the coated surface 25 times. The cleaner was allowed to dry and then wiped off with a soft tissue.

The following results were obtained:

TABLE I

Effectiveness of Stabilizers in an Acrylic Lacquer And an Alkide-Melamine Enamel[1]

| Type of Coating | Stabilizer[2] | % Gloss Restored After 350 Hours Exposure[3] |
|---|---|---|
| Alkide-Melamine | None | 45 |
| Alkide-Melamine | Stabilizer prepared according to Example 1 | 58 |

[1]Samples weathered according to ASTM Procedure G 53-77.
[2]Stabilizer concentration is 1% based on weight of binder.
[3]20° gloss measurements.

TABLE II

Effectiveness of Stabilizers in an Acrylic Enamel[1]

| Stabilizer[2] | Hours to Crazed Surface |
|---|---|
| None | 750 |
| Stabilizer of Example 1 | 1000 |

[1]Samples weathered according to ASTM Procedure G 53-77.
[2]Stabilizer concentration is 1% based on weight of binder.

These substituted melamine compositions find particular utility as ultraviolet stabilizers in organic compositions requiring ultraviolet stability. Such compositions include polymeric compositions such as, for example, polyester fiber and molding compositions, poly-α-olefins, polyamides, acrylics, polyurethanes and the like, as well as molded or shaped articles, film and coatings formed from such materials, and the like. Such compositions are particularly useful in paints and finishes which are used outdoors and exposed to weathering such as lacquers and enamels used in painting automobiles, outdoor furniture and the like.

The invention has been described in detail with particular reference to preferred embodiments thereof, but it will be understood that variations and modifications can be effected within the spirit and scope of the invention.

I claim:

1. An organic composition susceptible to ultraviolet degradation stabilized against such degradation with a stabilizing amount of a compound having the formula:

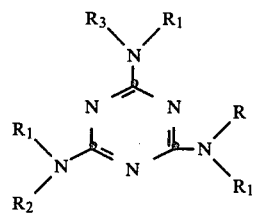

wherein R is a member selected from the group consisting of:

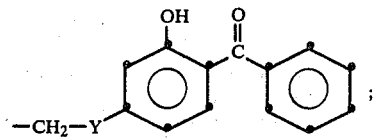

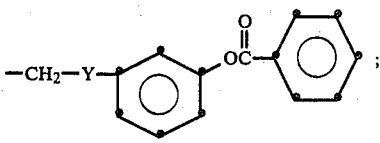

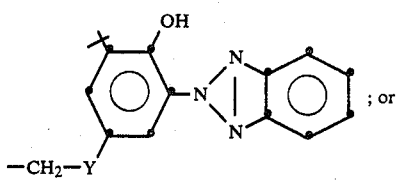

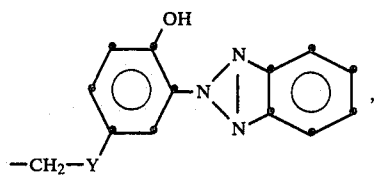

$R_1$ is a member selected from the group consisting of —$CH_2OH$ and —$CH_2OX$ where X is a branched or unbranched alkyl group containing 1 to 18 carbon atoms, $R_2$ is a member selected from the group consisting of:

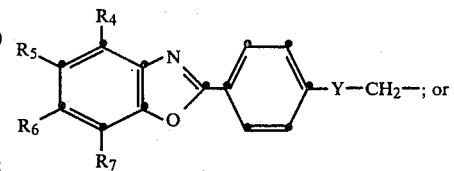

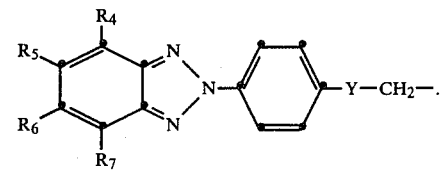

$R_3$ is the same as $R_1$ or $R_2$;

$R_4$, $R_5$, $R_6$ and $R_7$ can be hydrogen, lower branched or unbranched alkyl group containing 1 to 12 carbon atoms, an alkoxy containing 1 to 12 carbon atoms or chloro, and Y is an oxy group, an alkyl oxy group, an oxy alkyl oxy group, a carbonyl oxy group, or an oxy alkyl carbonyl group, wherein said alkyl member is a branched or unbranched alkyl group containing 1 to 4 carbon atoms.

2. An organic composition susceptible to ultraviolet degradation stabilized against such degradation with a stabilizing amount of a compound having the formula:

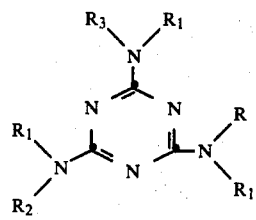

wherein R is a member selected from the group consisting of:

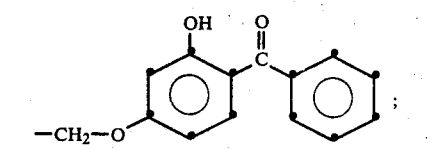

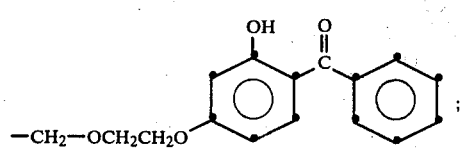

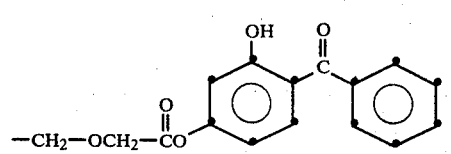

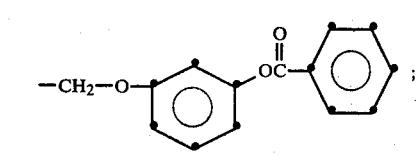

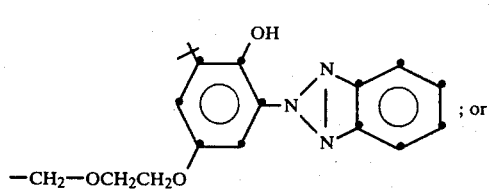

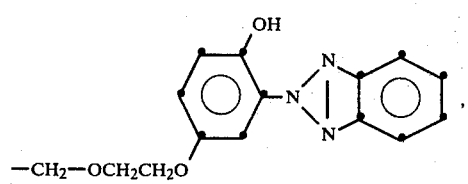

$R_1$ is a member selected from the group consisting of —$CH_2OH$ and —$CH_2OX$ where X is a branched or unbranched alkyl group containing 1 to 18 carbon atoms;

$R_2$ is a member selected from the group consisting of:

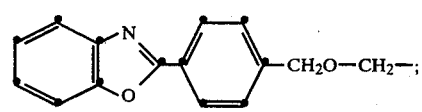

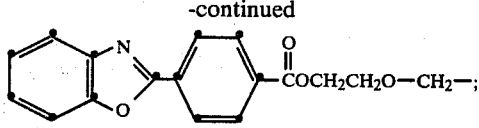

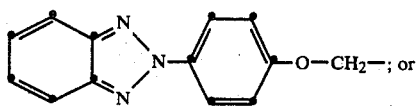

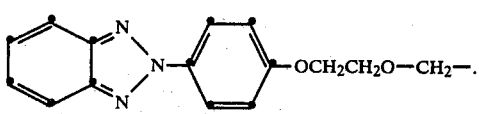

$R_3$ is the same as $R_1$ or $R_2$.

3. An organic composition according to claim 2 wherein said compound has the formula:

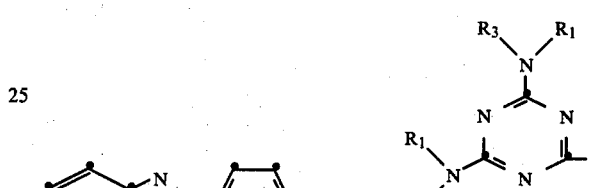

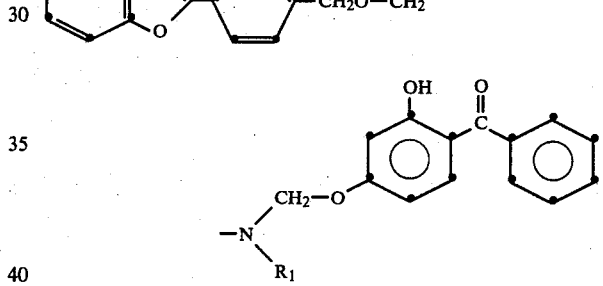

wherein:
$R_1$ is a member selected from the group consisting of —$CH_2OH$ and —$CH_2OX$ where X is a branched or unbranched alkyl group containing 1 to 18 carbon atoms, and
$R_3$ is the same as $R_1$.

4. An organic composition according to claim 3 wherein said compound has the formula:

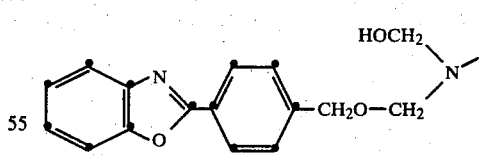

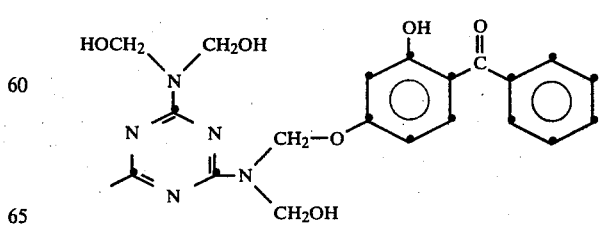

5. An organic composition according to claim 3 wherein said compound has the formula:

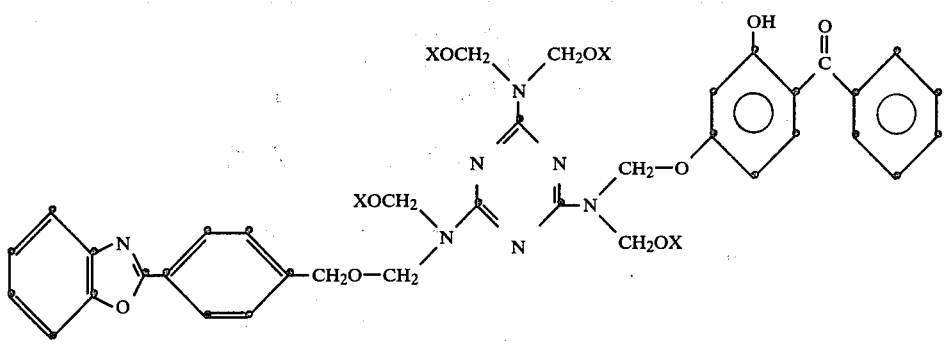

where X is a branched or unbranched alkyl group containing 1 to 18 carbon atoms.

6. An organic composition according to claim 3 wherein said compound has the formula:

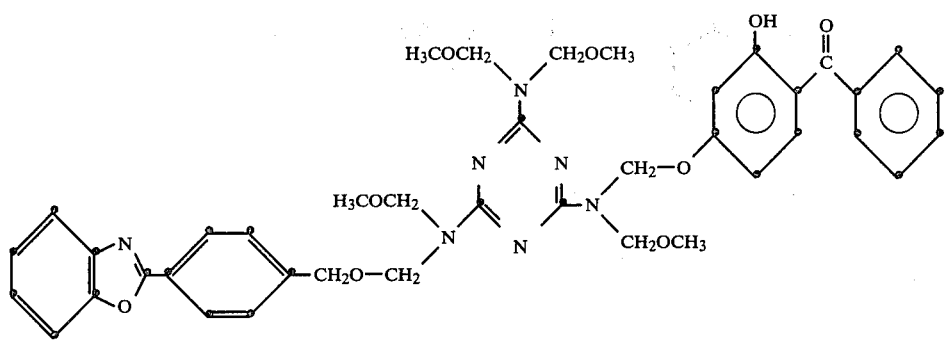

7. An organic composition according to claim 2 wherein said compound has the formula:

wherein:
R₁ is a member selected from the group consisting of —CH₂OH and —CH₂OX where X is a branched or unbranched alkyl group containing 1 to 18 carbon atoms.

8. An organic composition according to claim 7 wherein said compound has the formula:

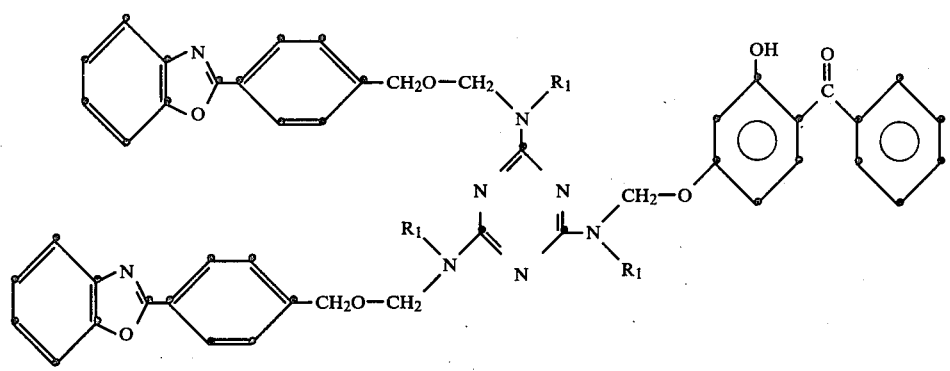

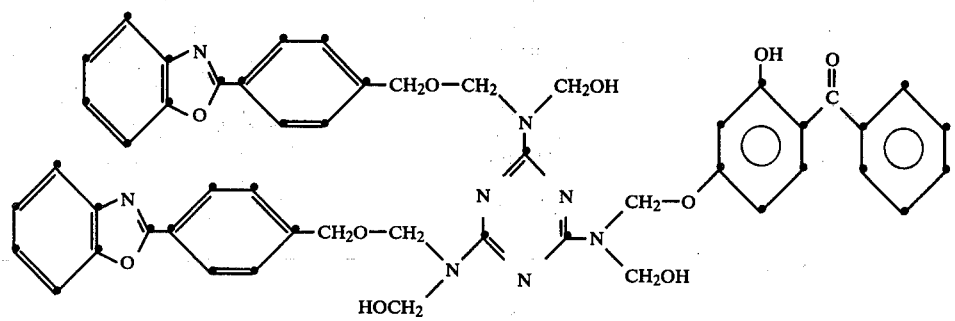

9. An organic composition according to claim 7 wherein said compound has the formula:

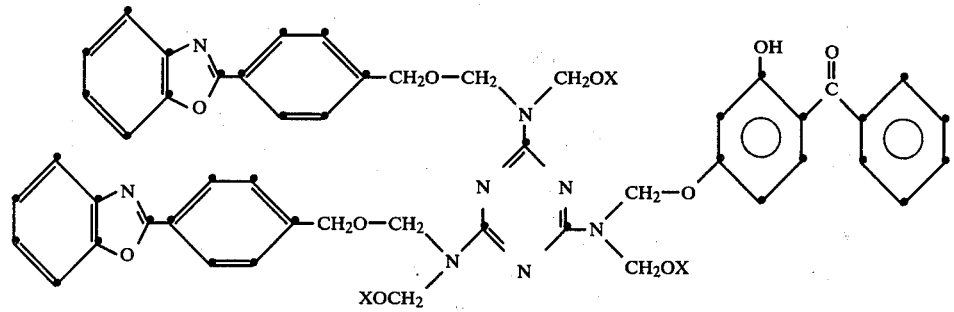

where X is a branched or unbranched alkyl group containing 1 to 18 carbon atoms.

10. An organic composition according to claim 7 wherein said compound has the formula:

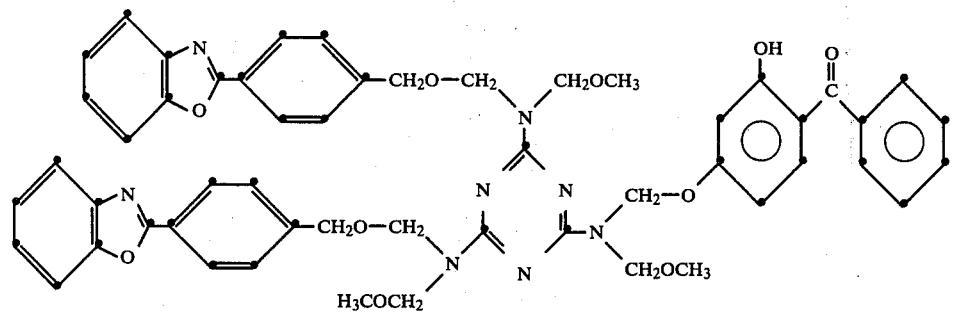

11. An organic composition according to claim 2 wherein said compound has the formula:

wherein:

$R_1$ is a member selected from the group consisting of —$CH_2OH$ and —$CH_2OX$ where X is a branched or unbranched alkyl group containing 1 to 18 carbon atoms, and $R_3$ is the same as $R_1$.

12. An organic composition according to claim 11 wherein said compound has the formula:

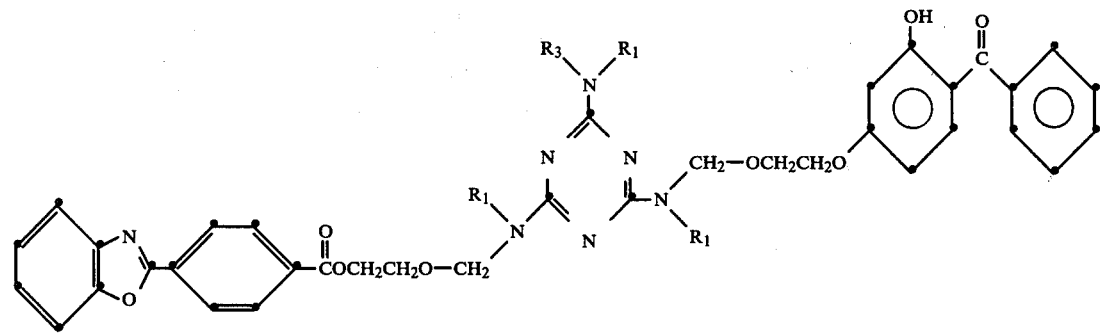

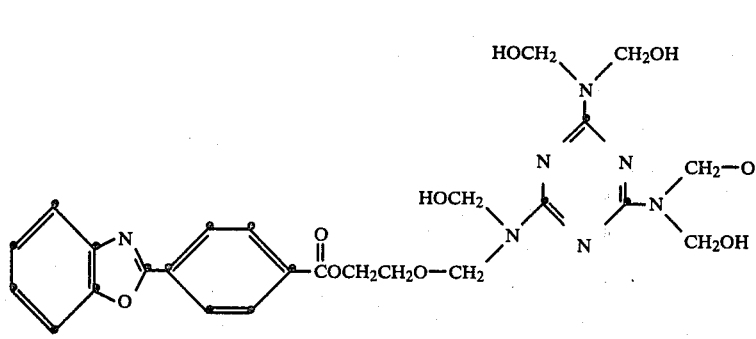
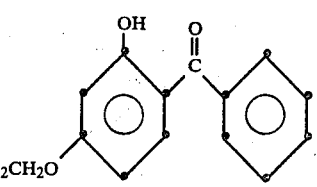
13. An organic composition according to claim 11 wherein said compound has the formula:
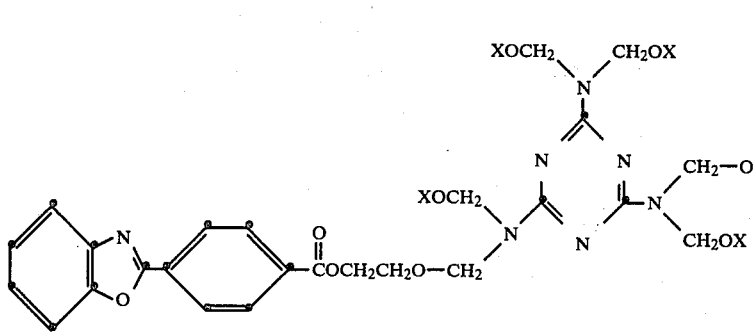
where X is a branched or unbranched alkyl group containing 1 to 18 carbon atoms.
14. An organic composition according to claim 11 wherein said compound has the formula:
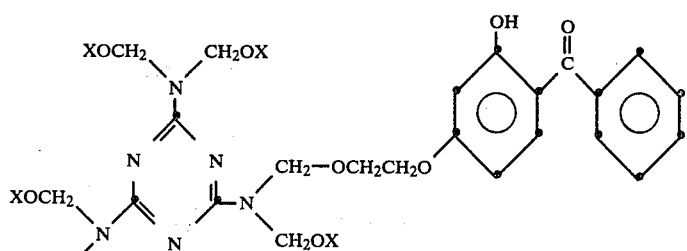
15. An organic composition according to claim 2 wherein said compound has the formula:
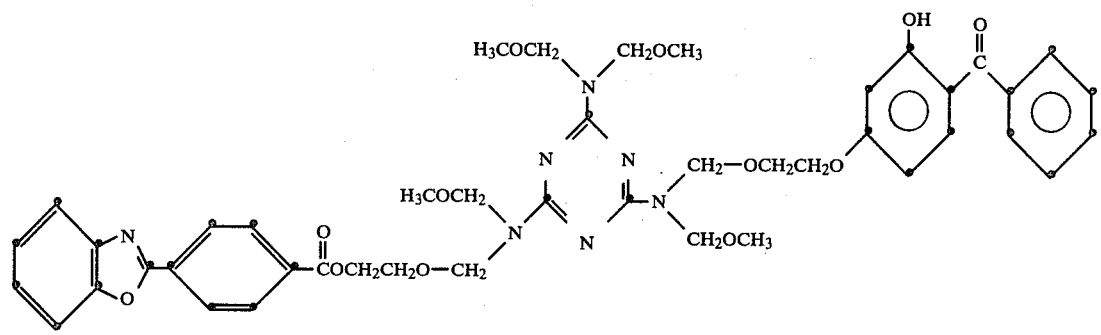
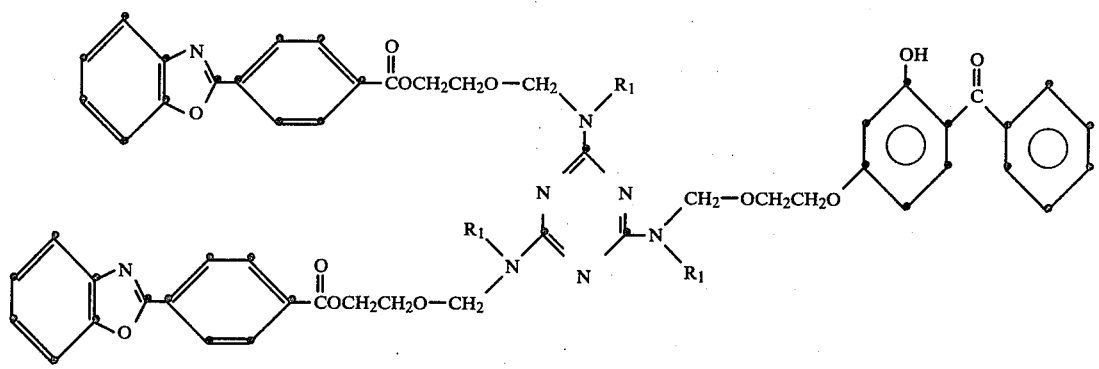
wherein:

$R_1$ is a member selected from the group consisting of —CH$_2$OH and —CH$_2$OX where X is a branched or unbranched alkyl group containing 1 to 18 carbon atoms.

16. An organic composition according to claim 15 wherein said compound has the formula:

17. An organic composition according to claim 15 wherein said compound has the formula:

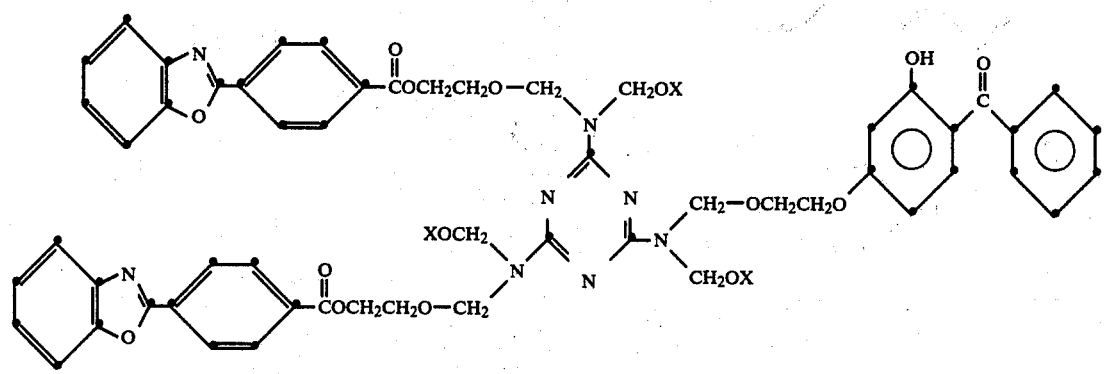

where X is a branched or unbranched alkyl group containing 1 to 18 carbon atoms.

18. An organic composition according to claim 15 wherein said compound has the formula:

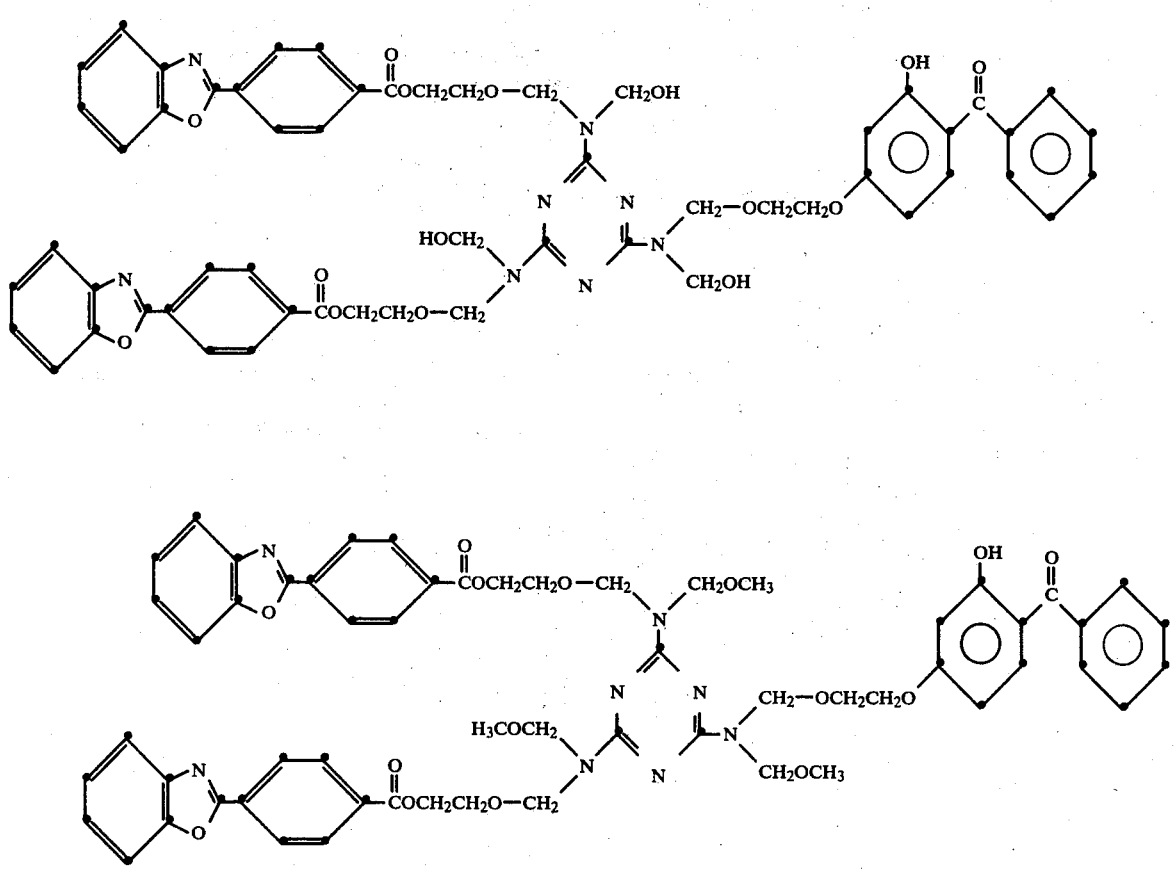

19. An organic composition according to claim 2 wherein said compound has the formula:

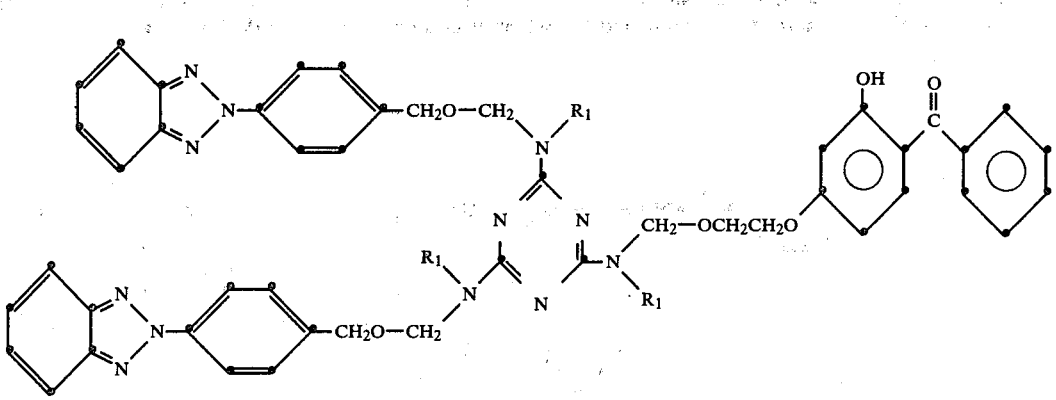

wherein:

$R_1$ is a member selected from the group consisting of —CH$_2$OH and —CH$_2$OX where X is a branched or unbranched alkyl group containing 1 to 18 carbon atoms.

20. An organic composition according to claim 19 wherein said compound has the formula:

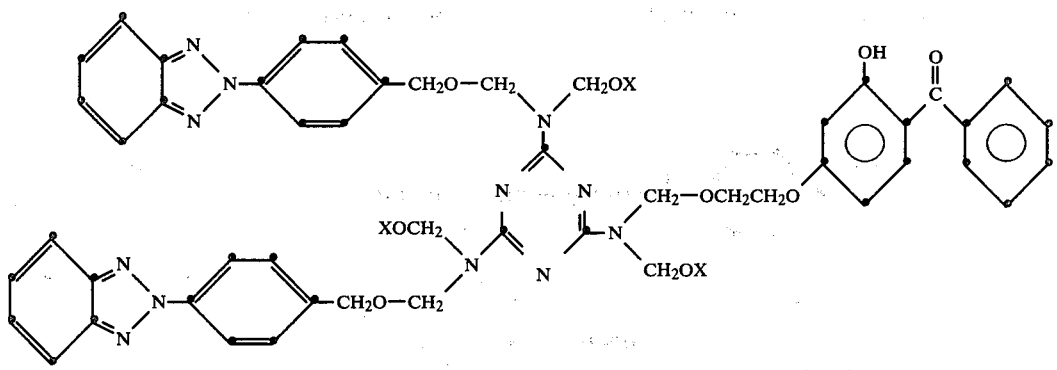

where X is a branched or unbranched alkyl group containing 1 to 18 carbon atoms.

21. An organic composition according to claim 19 wherein said compound has the formula:

22. An organic composition according to claim 19 wherein said compound has the formula:

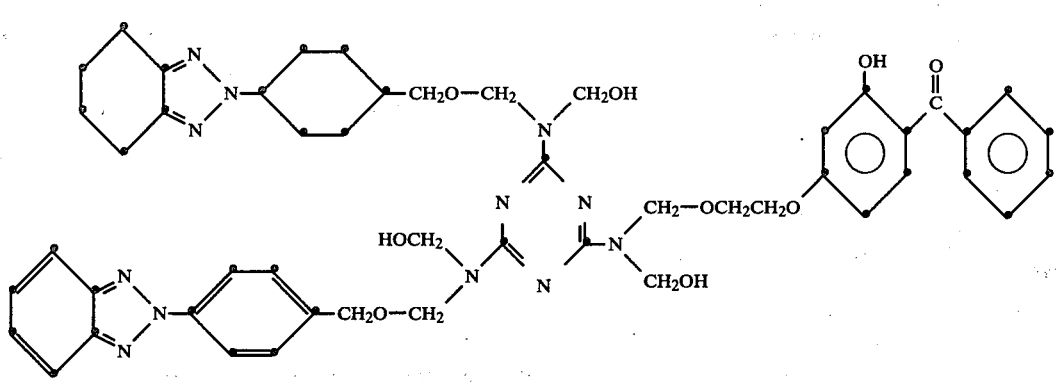

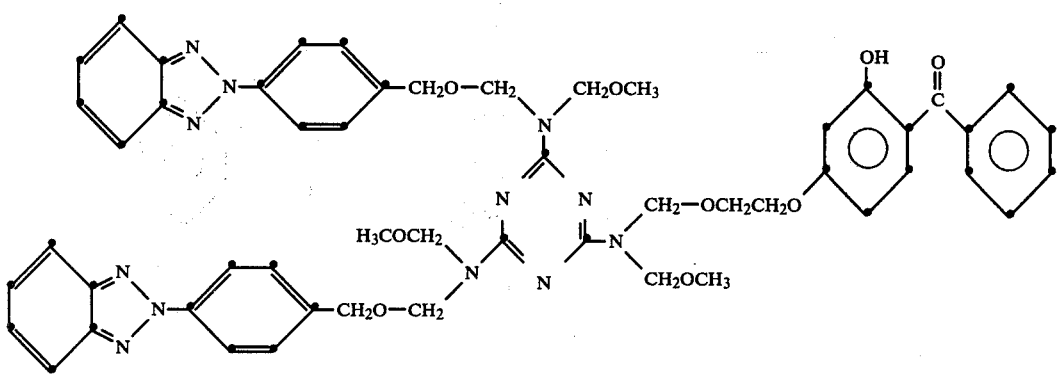

23. An organic composition according to claim 2 wherein said compound has the formula:

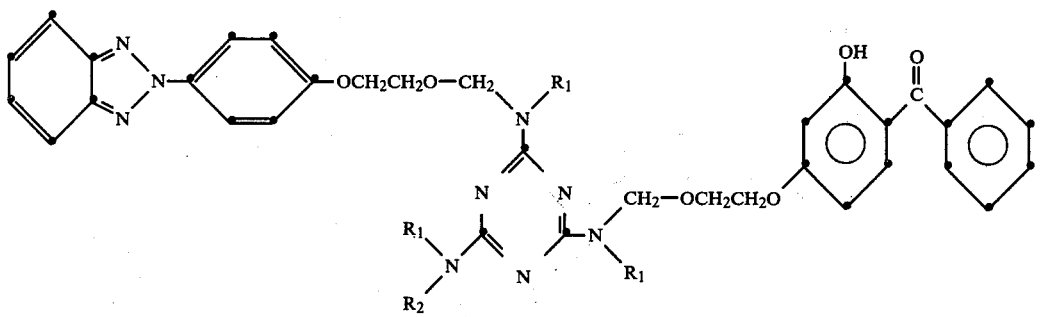

wherein:
R₁ is a member selected from the group consisting of —CH₂OH and —CH₂OX where X is a branched or unbranched alkyl group containing 1 to 18 carbon atoms.

24. An organic composition according to claim 23 wherein said compound has the formula:

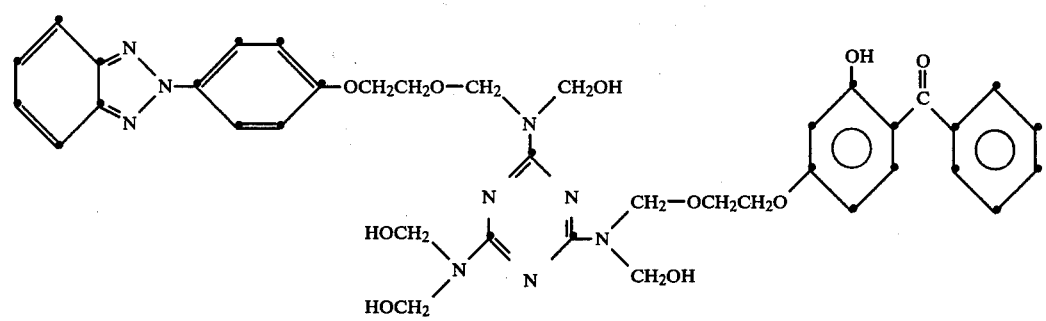

25. An organic composition according to claim 23 wherein said compound has the formula:

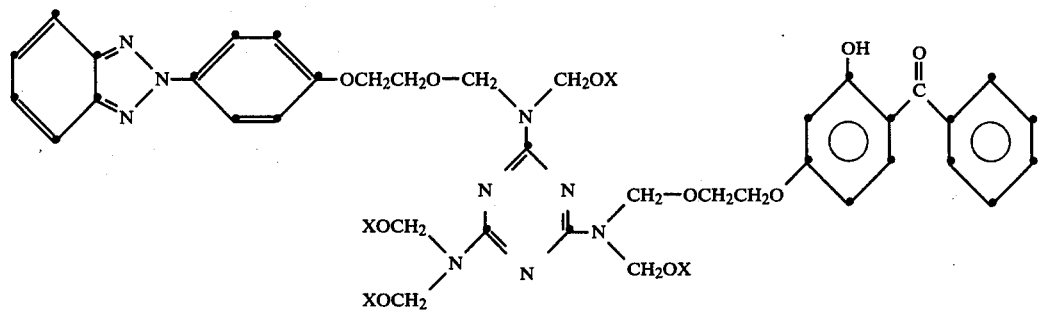

where X is a branched or unbranched alkyl group containing 1 to 18 carbon atoms.

26. An organic composition according to claim 23 wherein said compound has the formula:

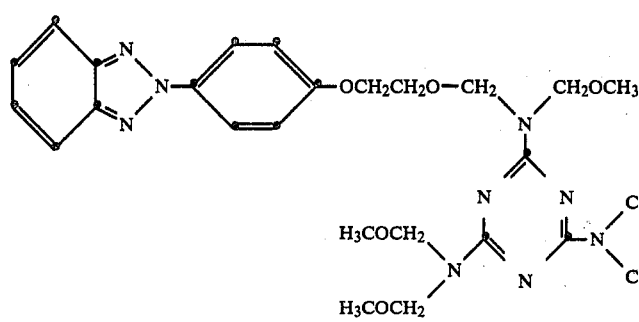
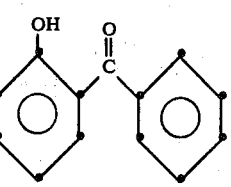

27. An organic composition according to claim 2 wherein said compound has the formula:

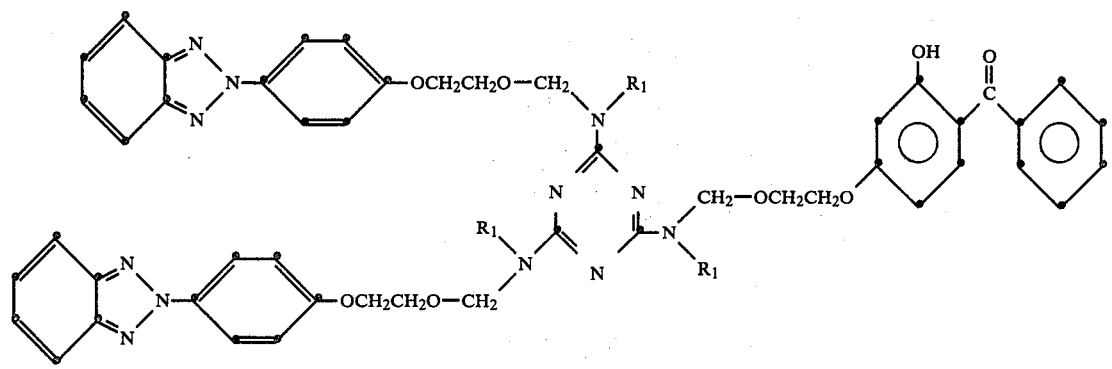

wherein:
R₁ is a member selected from the group consisting of —CH₂OH and —CH₂OX where X is a branched or unbranched alkyl group containing 1 to 18 carbon atoms.

28. An organic composition according to claim 27 wherein said compound has the formula:

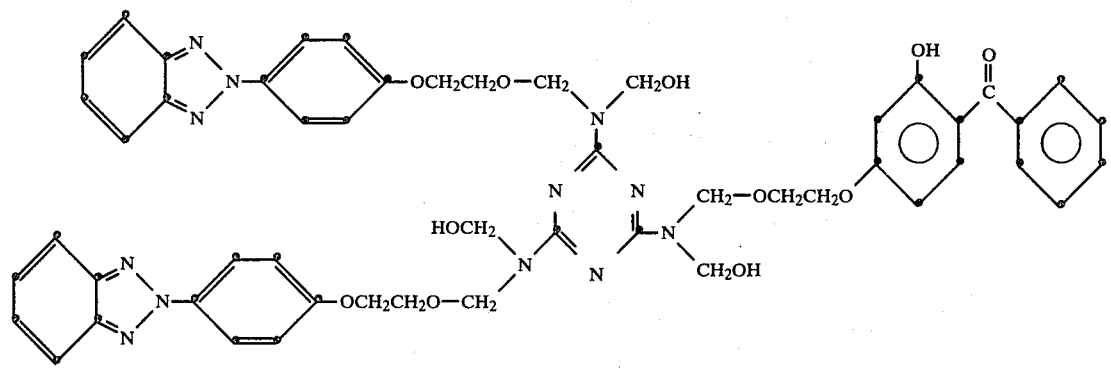

29. An organic composition according to claim 27 wherein said compound has the formula:

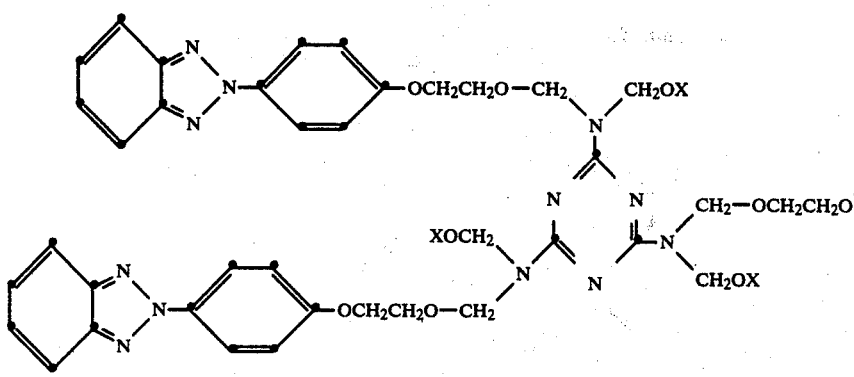
where X is a branched or unbranched alkyl group containing 1 to 18 carbon atoms.
30. An organic composition according to claim 27 wherein said compound has the formula:
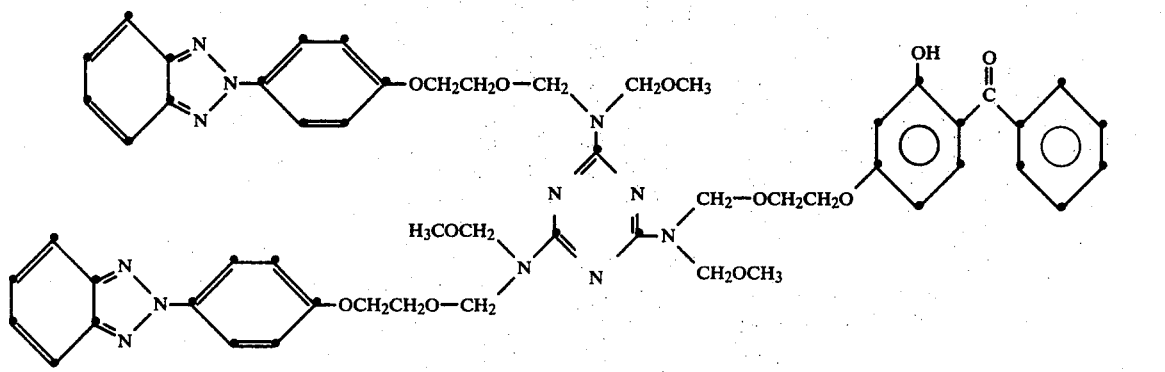
31. An organic composition according to claim 2 wherein said compound has the formula:
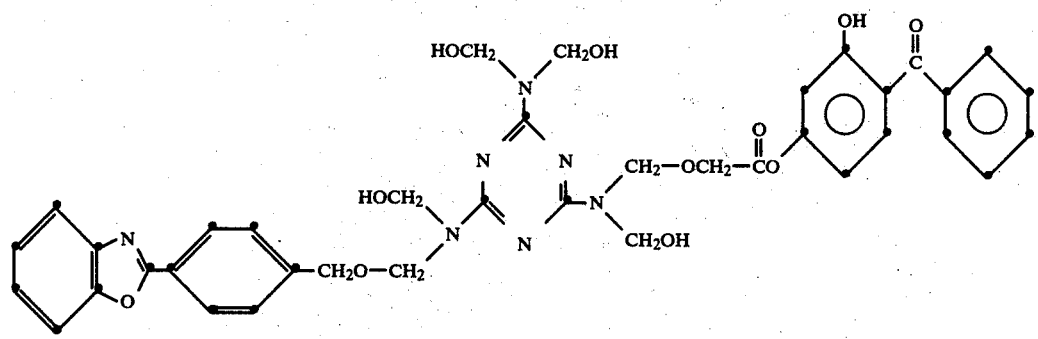
32. An organic composition according to claim 31 wherein said compound has the formula:
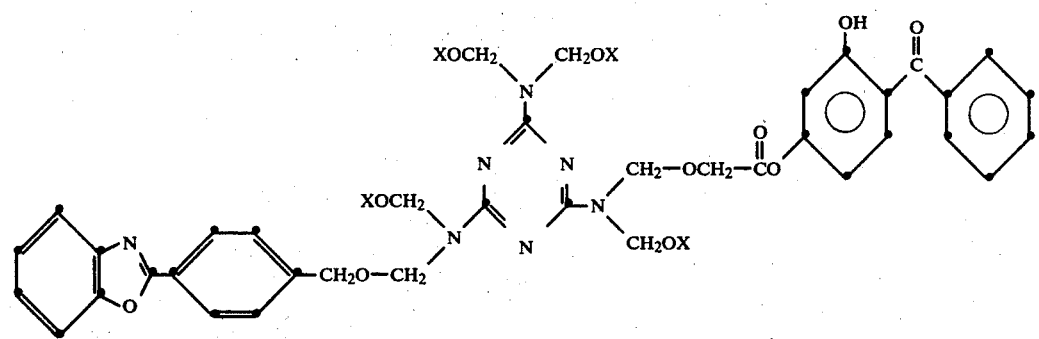

where X is a branched or unbranched alkyl group containing 1 to 18 carbon atoms.

33. An organic composition according to claim 31 wherein said compound has the formula:

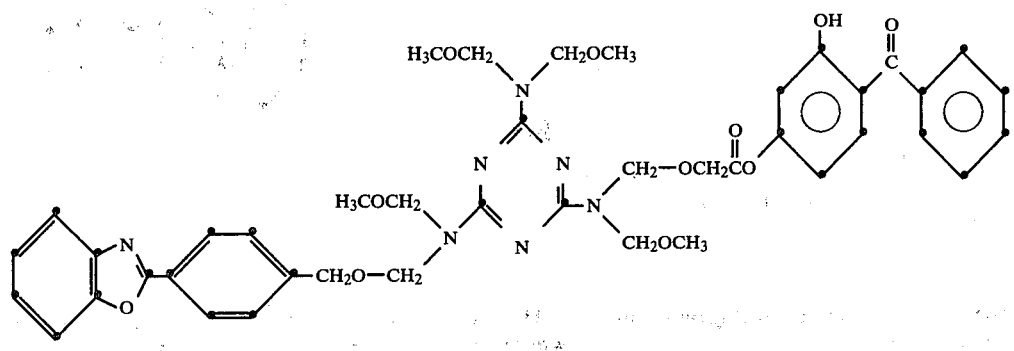

34. An organic composition according to claim 2 wherein said compound has the formula:

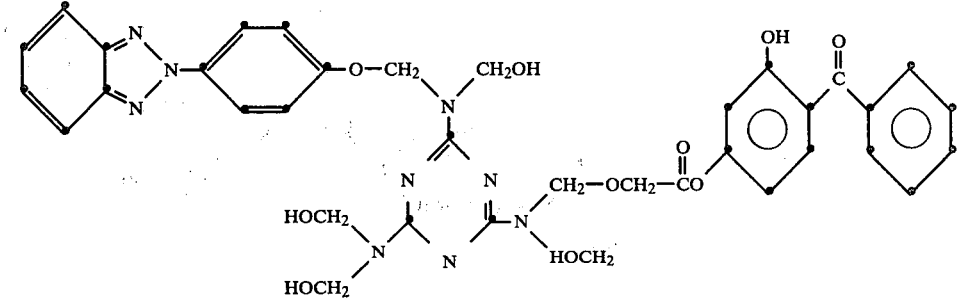

wherein said compound has the formula:

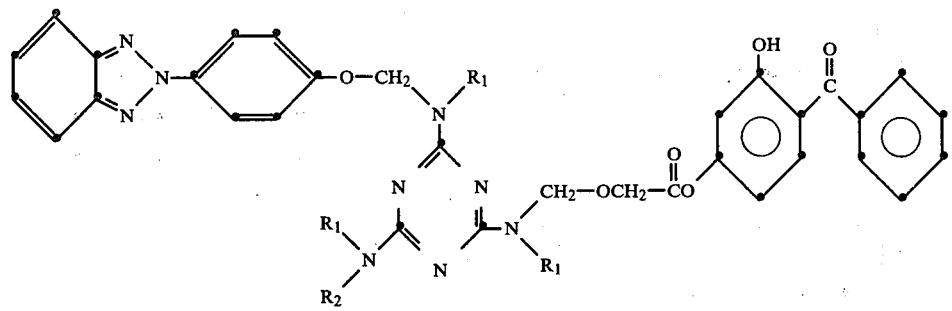

wherein:

$R_1$ is a member selected from the group consisting of —CH$_2$OH and —CH$_2$OX where X is a branched or unbranched alkyl group containing 1 to 18 carbon atoms, and $R_2$ is the same as $R_1$.

35. An organic composition according to claim 34 wherein said compound has the formula:

36. An organic composition according to claim 34 wherein said compound has the formula:

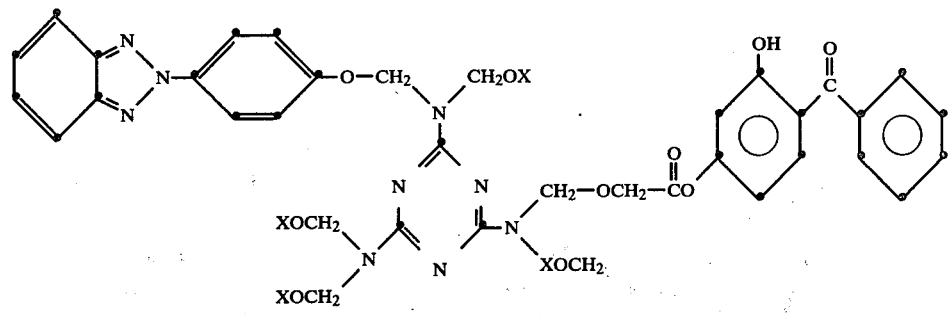

where X is a branched or unbranched alkyl group containing 1 to 18 carbon atoms.

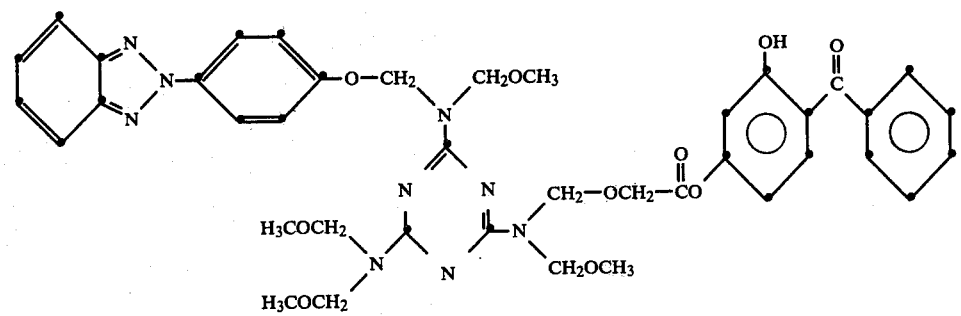
37. An organic composition according to claim 34 wherein said compound has the formula:
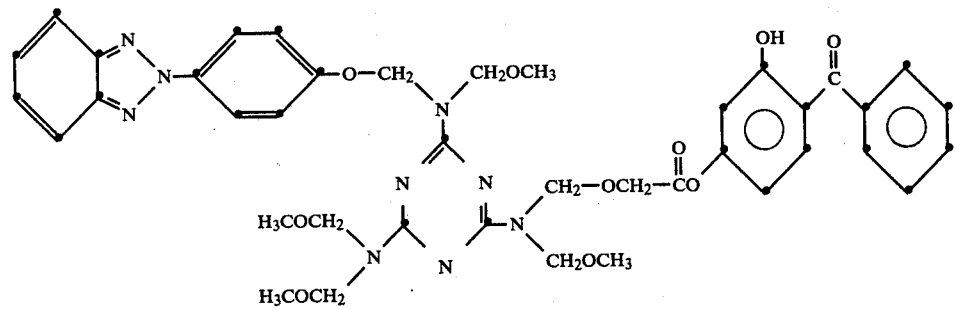
* * * * *

UNITED STATES PATENT AND TRADEMARK OFFICE
CERTIFICATE OF CORRECTION

PATENT NO. : 4,418,002

DATED : November 19, 1983

INVENTOR(S) : Joseph S. Zannucci and Wayne P. Pruett

It is certified that error appears in the above-identified patent and that said Letters Patent is hereby corrected as shown below:

Columns 19 and 20, delete the formula in Claim 20 and insert therefor

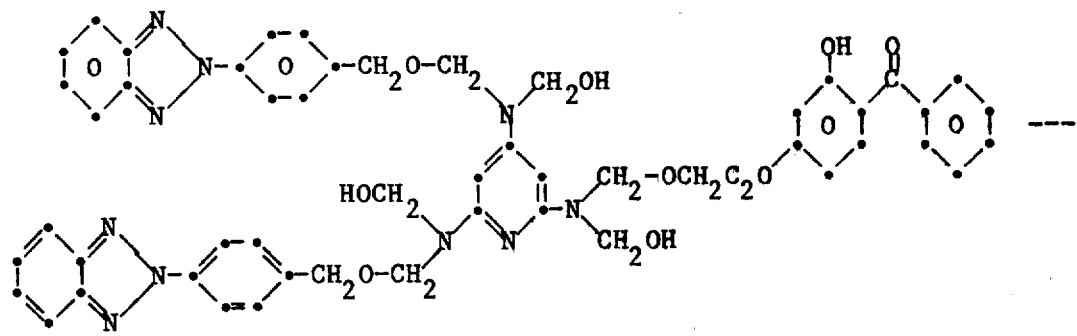

Signed and Sealed this

Twenty-sixth Day of June 1984

[SEAL]

Attest:

GERALD J. MOSSINGHOFF

Attesting Officer

Commissioner of Patents and Trademarks